United States Patent

Marimont

[11] Patent Number: 5,835,099
[45] Date of Patent: Nov. 10, 1998

[54] REPRESENTING A REGION OF A COLOR IMAGE USING A SPACE-COLOR SEPARABLE MODEL

[75] Inventor: David H. Marimont, Palo Alto, Calif.

[73] Assignee: Xerox Corporation, Stamford, Conn.

[21] Appl. No.: 670,978

[22] Filed: Jun. 26, 1996

[51] Int. Cl.$^6$ ............................................ G06T 11/00
[52] U.S. Cl. ............................................................. 345/431
[58] Field of Search .................................. 345/425–432, 345/433

[56] References Cited

U.S. PATENT DOCUMENTS

| | | | |
|---|---|---|---|
| 5,339,387 | 8/1994 | Frankel | 345/431 |
| 5,473,736 | 12/1995 | Young | 345/431 |
| 5,611,029 | 3/1997 | Watters et al. | 345/431 |

OTHER PUBLICATIONS

Mark S. Peercy and Lambertus Hesselink, "Dichromatic Color Representations for Complex Display Systems", *Proceedings Visulization '93*, 1993, pp. 212–219.

Steven A. Shafer, "Using Color to Separate Reflection Components", *Color Research and Application*, Winter 1985, vol. 10, No. 4, pp. 210–218.

Henri Gouraud, "Continuous Shading of Curved Surfaces", *Tutorial and Selected Readings In Interactive Computer Graphics*, 1980, pp. 302–308(reprinted from IEEE *Transactions on Computers*, 1971).

James D.Foley, Andries van Dam, Steven K. Feiner and John F. Hughes, *Computer Graphics Principles and Practice*, Second Edition, Chapter 16, Sections 16.2.4–6, 16.3.1–2, 1992, pp. 736–744.

Paul J. Besl and Ramesh C. Jain, "Segmentation Through Variable–Order Surface Fitting",*IEEE Transaction on Pattern Analysis and Machine Intelligence*, vol. 10 No. 2, Mar. 1988, pp. 167–192.

M. Garland and P. Heckbert, "Fast Polygonal Approximation of Terrains and Height Fields," *Carnegie Mellon University Technical Report* CMU–CS–95–181, Carnegie Mellon University, Pittsburgh, PA, Sep., 1995.

M. Kocher and M. Kunt, "Image data compression by contour texture modeling", *Applications of Digitial Image Processing*, Andre Oosterlink, Andrew G. Tescher, Eds., Proceedings of the SPIE, 1983, pp. 132–139.

Y.G. Leclerc, "Constructing Simple Stable Descriptions for Image Partitioning", *International Journal of Computer Vision*, vol. 3, No. 1, pp. 73—102, 1989.

J.K. Yan and D.J. Sakrison, "Encoding of Images Based on a Two–Component Source Model",*IEEE Transactions on Communications*, vol. Com–25, No. 11, Nov., 1977, pp. 1315–1322.

Primary Examiner—Almis R. Jankus

[57] ABSTRACT

A representation of a color image region is called a space-color separable (SCS) model because the spatial structure of the image region is represented separately from that of the color-space structure. The representation uses two functions, one to represent the region's spatial structure and another to represent its color-space structure. In one implementation, the spatial structure is represented by polynomials of arbitrary degree to map image locations to the parameter values of the color-space model which in turn maps these parameter values to a zero-, one-, two-, or three-dimensional linear subspace of color space. The representation is resolution-independent and can accommodate both transformations of image coordinates and transformation of color coordinates. In particular, the polynomial-linear implementation can easily accommodate both affine transformations of image coordinates and linear transformations of color coordinates. This flexibility makes it useful for a variety of applications in illustration and image editing systems. The invention combines several features: representing smooth shading or textures in color images; separating the spatial structure of the colors in the image from its color space structure; and enabling transformations of images and their colors by transforming the SCS model itself.

15 Claims, 7 Drawing Sheets

FIG. 5  Input Image Region SCS Representation Matrix

REPRESENTING A REGION OF A COLOR IMAGE USING A SPACE-COLOR SEPARABLE MODEL

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to a processor-based technique in the field of color image representation, and more particularly, to a process for compactly representing a region of a color image using a model of the spatial structure of the colors in the image region and a model of the color space structure of the colors in the image region, where the former structure is separate from the latter, enabling independent manipulation of one or both models.

Digitally representing an image of a natural scene typically consists of sampling the image in space and quantizing each sample in brightness. It is not a compact representation because all of the samples, conventionally referred to as pixels, are considered as if they convey the same amount of information. Synthetic images—those generated using drawing, painting or three dimensional (3D) graphics tools—may be similarly represented. Alternative data representations for representing or encoding color regions in digital images have been proposed; these representations typically seek the goals of being more compact and at the same time representing colors with a minimum loss of subjective quality. Natural images and synthetic images having a photorealistic appearance, in particular, contain regions of color that are patterned or textured, and the process of compactly and accurately encoding the patterns and textures of photographic or photorealistic images is the subject of much research and effort.

Paul J. Besl and Ramesh C. Jain, in "Segmentation Through Variable-Order Surface Fitting," in *IEEE Transactions on Pattern Analysis and Machine Intelligence*, vol. 10, no. 2, pp. 167–192, 1988, discloses a representation for range or grayscale intensity images and an algorithm for computing it. The representation is a partition of the image into arbitrarily-shaped regions, each of which is described by a bivariate polynomial function of variable degree (the bivariate polynomial here is a function of image coordinates x and y). The representation makes it possible to compute a complete, noiseless reconstruction based on the extracted functions and regions. The algorithm computes a coarse initial segmentation, which is refined by an iterative region-growing method based on variable-degree surface fitting.

M. Kocher and M. Kunt disclose a method for encoding textures in "Image data compression by contour texture modeling" in *Applications of Digital Image Processing*, Andre Oosterlink, Andrew G. Tescher, Eds., Proceedings of the SPIE, 1983, pp. 132–139. Kocher and Kunt disclose a coding technique for gray level images based on the segmentation of the original image into regions whose gray level evolution contains no sharp discontinuities. Each region is then described by its texture and by its contour components. The texture coding scheme is composed of two steps: first, the general shape of the gray level evolution is approximated for each region by a 2-D polynomial function. The polynomial order is determined for each region depending on the error introduced by the approximation and its cost, defined by the number of bits used to describe the polynomial coefficients. Then, the noise of the original image, removed by a preprocessing operation, is approximated by a pseudo-random signal which is added to the polynomial description of each region in order to render the image in a more natural manner. Exploitation of image redundancy is thus achieved by describing the texture information by means of 2-D polynomial functions resulting in a high compression ratio.

M. Garland and P. Heckbert, in "Fast Polygonal Approximation of Terrains and Height Fields," *Carnegie Mellon University Technical Report* CMU-CS-95-181, Carnegie Mellon University, Pittsburgh, Pa., September, 1995, disclose a class of algorithms that take a height field as input, and approximate it with a mesh of triangles known as a triangulated irregular network (TIN). A triangulation is a partition in which each region has the standard shape of a triangle. A height field is a set of height samples over a planar domain. Applications of the algorithm include fast rendering of terrain data for flight simulation using the triangulation, and the fitting of surfaces to range data in computer vision. An extension of the algorithms to image data that includes color information in addition to height field data is discussed in Section 4.6, where it is disclosed that the extension allows the algorithms to be used to simplify terrains with color texture or planar color images. The output of such a simplification is a triangulated surface with linear interpolation of color across each triangle, which can be accomplished by hardware-assisted Gouraud shading on most graphics workstations. Garland and Heckbert disclose that such a model is a possible substitute for texture mapping when that is not supported by hardware. FIG. 25 at pg. 37 shows the results of applying one of the algorithms to an original color image of an animal; the rendered image produced by the algorithm shows the animal approximated with Gouraud shaded triangles.

Gouraud shading is a well-known technique in computer graphics technology for rendering smoothly shaded color in regions of color images. Descriptions of Gouraud shading may be found in computer graphics textbooks, such as, for example, James D. Foley, Andries van Dam, Steven K. Feiner, John F. Huges, *Computer Graphics: Principles and Practice*, 2nd edition, Addison-Wesley Publishing Company, Reading, Mass., 1990.

Image interaction tools, such as Adobe Illustrator, that permit interaction with color images provide functions for filling image regions with smoothly varying patterns of color. Spatial patterns available include lines and circles; colors may vary along a polygonal arc in color space, and it appears that a color space function interpolates colors selected by the user along this arc to determine the fill colors. The filling of a region with the interpolated colors appears to be done by dividing the region into rectangular (when the pattern of spatial variation is a line) or annular (when the pattern is a circle) subregions, and then filing them with a constant color. When the user applies a spatial transformation, such as a rotation or scaling transformation, to a filled region, the software applies a spatial transformation to the region by transforming the shapes of the subregions of constant color; the colors themselves appear to be unaffected by such a transformation. Thus, the transformations do not seem to work on a functional description of the pattern of color variation in the region.

Many existing texture approximation and representation techniques, such as the one described above by Besl et al.

and Kocher et al., are used for coding smoothly varying shading and textures in grayscale images. The image triangulation method disclosed by Garland and Heckbert use the well-known technique of Gouraud shading to represent the colors in an image region, producing a linear interpolation of colors between each of the three vertices of the triangle; the Gouraud shading technique is limited in the types of textures and patterns that can be approximated in a manner that provides realistic results. Color image editing tools require functionally-based, compact image region representations if they are to provide a user with flexible, powerful and efficient color editing capabilities. Some existing systems provide tools for a high-level description of smoothly shaded colors in an image region, but appear to implement spatial transformations of the image region by applying the transformations to much lower-level descriptions of the colors. Many existing systems for image editing and color prepress implement color transformations by transforming bitmaps, and not by transforming high-level descriptions at all.

SUMMARY OF THE INVENTION

The present invention has as its design premises that a useful representation of a region of a color image must produce colors that are subjectively acceptable in appearance when rendered and displayed, must be compact, and must preserve the acceptable appearance of the colors during editing operations. The invention is based on two observations: the first is that the smooth shading or texture of colors in an image region has a certain spatial structure that can be mathematically modeled; the second is that the same smooth shading or texture can also be modeled in a color space, or in a subspace or subset of color space. The invention is premised on the discovery that the separate modeling of the spatial structure and the color space structure of the colors in an image region provides a powerful and flexible technique for representing color image regions. Once individually modeled, the subsequent composition of the two models into a single representation then provides a compact way to represent color texture in an image region. This representation is referred to as the "space-color separable" model also referred to as the SCS model hereafter. The invention combines three features: (1) representing smooth shading or textures in color images; (2) separating the spatial structure of the colors in an image region from its color space structure; and (3) enabling transformations of images and their colors by transforming the SCS model itself.

The SCS model uses two functions, one to represent the spatial structure of the colors in an image region and another to represent the color-space structure of the colors in the region. The first function maps the spatial structure of the colors in the image domain to a parameter space. The second function maps the parameter space to a zero-, one-, two-, or three-dimensional subset (i.e., the whole space itself) of the color space that represents the distribution of the colors in the image region. The composition of the two functions maps the colors of the image region to the subset of the colors in color space.

In one implementation of the model, the spatial model uses polynomials of arbitrary degree to map image locations to a parameter space specifying the parameter values of the color-space model; a linear function in turn maps these parameter values to a subspace of the color space; the extension of the linear function to an affine function is trivial. An important advantage of the SCS model in this polynomial-linear implementation is that it is relatively straightforward to compute; the complexity of the two functions can be controlled independently, and simple functions that provide accurate and subjectively acceptable color representations can be selected. In addition, representing a color image region as an SCS model is useful in a variety of contexts. For example, the SCS model handles transformations of images and color space accurately and efficiently, making the representation especially suitable in image interaction and editing applications. In practice, a single matrix represents the composite of the two functions. Affine transformations of image coordinates transform the color representation by postmultiplying the SCS matrix with another matrix that depends on the affine transformation. Since scaling is an affine transformation, this means that the SCS model is resolution-independent. Linear transformations of color space transform the color representation by premultiplying the SCS matrix with a matrix that represents the linear transformation.

An SCS color region representation may be implemented in high-level representations of images, such as partitions of various types (planar maps, triangulations, vertical cell decompositions, etc.) as a way of representing the colors in a region or subregion of the partition. Specifically, the SCS representation may be used as a signal property descriptor in an image structure map representation of an image disclosed in copending, commonly assigned U.S. patent applications Ser. Nos. 08/581,660, 08/639,636, and 08/660,058.

Because the SCS model is a relatively compact image representation, it is also useful in a variety of image compression, printing and display applications. For example, the SCS model produces a compact description of smoothly shaded region of a color image that can be transmitted efficiently to rendering hardware for either printing or display. Rendering hardware that understood the SCS description could very quickly print or display a good approximation to the smooth shading in the region of the color image.

Therefore, in accordance with one aspect of the present invention, a method is provided for operating a processor-controlled machine to compute a function representing color values of image locations in an image region of a color image. The machine includes memory for storing data including image definition data defining an image and instruction data. The machine also includes a processor connected for accessing the image definition data, and for accessing the instruction data stored in the memory for operating the machine. The method comprises obtaining a plurality of image region data items indicating image definition data defining an input color image region. Each image region data item indicates coordinate values of a respective image location in the input color image region and a color value of the respective image location. A first function is computed that represent a spatial image structure of the color image region; the first function maps each coordinate value indicating an image location in the color image region to a point in a parameter space. A second function is then computed representing a color space subset of a color space structure of the color image region; the second function maps each point in the parameter space to a color space location in the color space subset. A third function, referred to as the space-color separable function, is then computed as the composition of the first and second functions. The space-color separable function maps coordinate values of the image region to color values in the color space subset. The space-color separable function approximates the color values of the image locations in the color image region such that the space-color separable function, when used in place of the image region data items to represent colors in the input color image region, produces a rendered color image region having an appearance substantially similar to the input color image region.

The novel features that are considered characteristic of the present invention are particularly and specifically set forth in the appended claims. The invention itself, however, both as to its organization and method of operation, together with its advantages, will best be understood from the following description of an illustrated embodiment when read in connection with the accompanying drawings. In the Figures, the same numbers have been used to denote the same component parts or steps. The description of the invention includes certain terminology that is specifically defined for describing the embodiment of the claimed invention illustrated in the accompanying drawings. These defined terms have the meanings indicated throughout this specification and in the claims, rather than any meanings that may occur in other sources, such as, for example, documents, if any, that are incorporated by reference herein elsewhere in this description.

DETAILED DESCRIPTION OF THE INVENTION

A. The Space-Color Separable Model

The following notation is used in this description: Upper-case italic letters denote matrices, and lower-case boldface letters denote vectors. Subscripted lower-case italic letters denote elements of matrices and vectors: $a_{ij}$ is element (i, j) of the matrix A, and $x_i$ is element i of the vector x. The superscript t denotes the transposition of a matrix or vector. The superscript + denotes the pseudoinverse of a matrix. Unsubscripted, lowercase italic letters denote functions and scalar variables.

Figure 1:
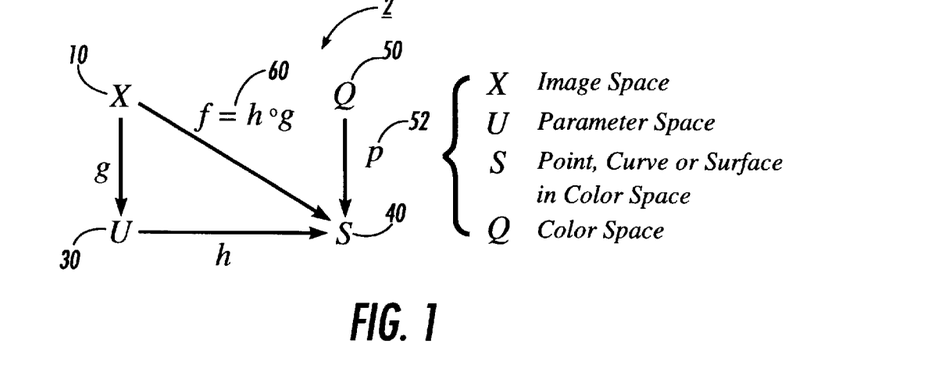
FIG. 1 is a diagram showing the general components of the space-color separable (SCS) model for representing a color image region.

FIG. 1 is a diagram showing the general components of the space-color separable model 2 for representing a color image region. Image region 10 is a color image region to be represented by the SCS model and is denoted as X; locations in image region 10 are denoted as a vector $x_i=(x_i, y_i)$. A color space 50 is denoted as Q, and a point in color space is denoted as a vector $q_i'$ and might be expressed in RGB as $(r_i,g_i,b_i)$. The $q_i$ might also be expressed in CIE XYZ, or in any other color space. A subset 40 of color space 50, denoted as S, is a point, curve, or surface in Q (or all of Q) containing color values that are approximations to the colors in image region 10. Function p is a projection of points in color space 50 to approximations of those points (colors) in subset 40, and subset 40 is selected with the constraint that it can be represented by a parameterizable function.

Parameter space 30, denoted as U, is a parameterization of subset 40 such that there exists a function h that maps an element of U to an element of S; function h has the requirement that for every point s on S, there exists a point u of U such that s=h(u). The dimension of parameter space 30 determines the dimension of subset 40; that is, the dimension of U determines whether S is a point, curve, surface, or the entire color space, equivalent to dimensions 0, 1, 2, and 3 respectively.

The goal of space-color separable model 2 is to represent the colors in a smoothly shaded region of the image with a function that can be decomposed into two parts, one that reveals the spatial structure (i.e., the image-space structure) of the region and one that reveals the color-space structure of the colors of the region. An image region 10 is composed of a set of pairs $(x_i,q_i)$. The overall SCS function 60 is denoted as f; it maps the $x_i$ to a point on the subspace S, such that $s_i=f(x_i)$, and $s_i$ is the representation of—actually the approximation to—$q_i$.

The function f is composed of two constituent functions. The first of these is g, which represents the spatial structure of the image region and maps the $x_i$ of image region 10 to an element of U, the parameter space 30 of color space subset 40, via $u_i=g(x_i)$. The second function, denoted as h, represents the structure of the color space subset and maps the $u_i$ to the color space subset S via $s_i=h(u_i)$. The composite function f represents the space-color separable model and is the composition of g and h, written as h∘g (where the small circle denotes composition) such that $s_i=f(x_i)=h(g(x_i))$.

Figure 2:
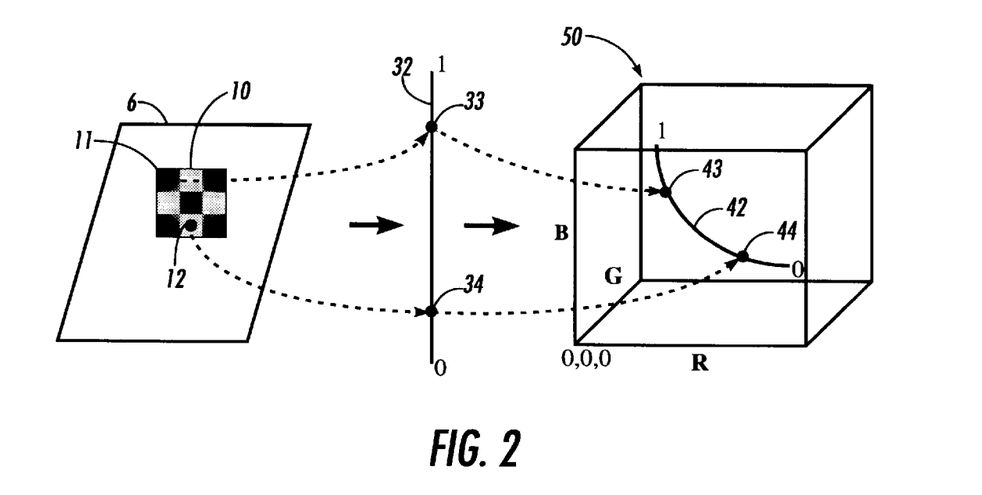
FIG. 2 illustrates the concepts of a first function mapping an input color image region to a one-dimensional parameter space, and a second function mapping the one-dimensional parameter space to a curve in color space according to the present invention.
Figure 3:
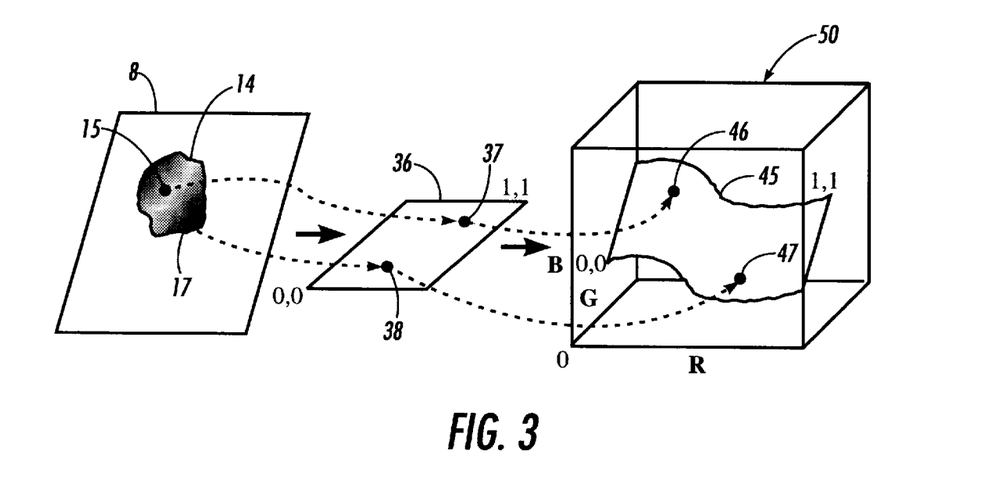
FIG. 3 illustrates the concepts of a first function mapping an input color image region to a two-dimensional parameter space, and a second function mapping the two-dimensional parameter space to a surface in color space according to the present invention.

FIGS. 2 and 3 illustrate the concepts of the space-color separable representation, insofar as the use of black and white drawings can adequately do this. In FIG. 2, a color image 6 contains color image region 10. The spatial structure of image region 10 is shown as having colors smoothly distributed in a checkerboard-like pattern; that is, assume that the light and dark colors smoothly vary at the transitions between them. Color space 50 is shown as RGB space; within color space 50 is subset 42 in the form of a curve that approximates the color space structure of the colors in image region 10; that is, the colors in image region 10 may be represented as approximately lying along curve 42. One-dimensional parameter space 32 is the parameterization of subspace 42. Colors 11 and 12 in image region 10 are mapped to points 33 and 34 in parameter space 32 by a function g; a function h maps points 33 and 34 to colors 43 and 44 in subspace 42.

In FIG. 3, color image region 14 represents a surface in color image 8 that has smoothly varying colors; the colors in image region 14 are shown being mapped to colors in a two-dimensional planar surface subspace 45 of RGB color space 50. In FIG. 3, the colors in image region 14 may be represented as approximately lying on planar surface 45. Two-dimensional parameter space 36 is the parameterization of subspace 45. Colors 15 and 17 in image region 14 are mapped to points 37 and 38 respectively in parameter space 37 by a function g; a function h maps points 37 and 38 to colors 46 and 47 in subspace 45. FIGS. 2 and 3 illustrate that the color-space structure selected to approximate the colors in an image region may vary independently of the spatial structure of the image region, and either the one- or two-dimensional approximations may be computed, depending on the complexity of the color variation in the image region. As will be noted later, both approximations may be computed for a given image region, and one of the computed representations then selected according to some specified selection criteria to represent the image region.

Figure 4:
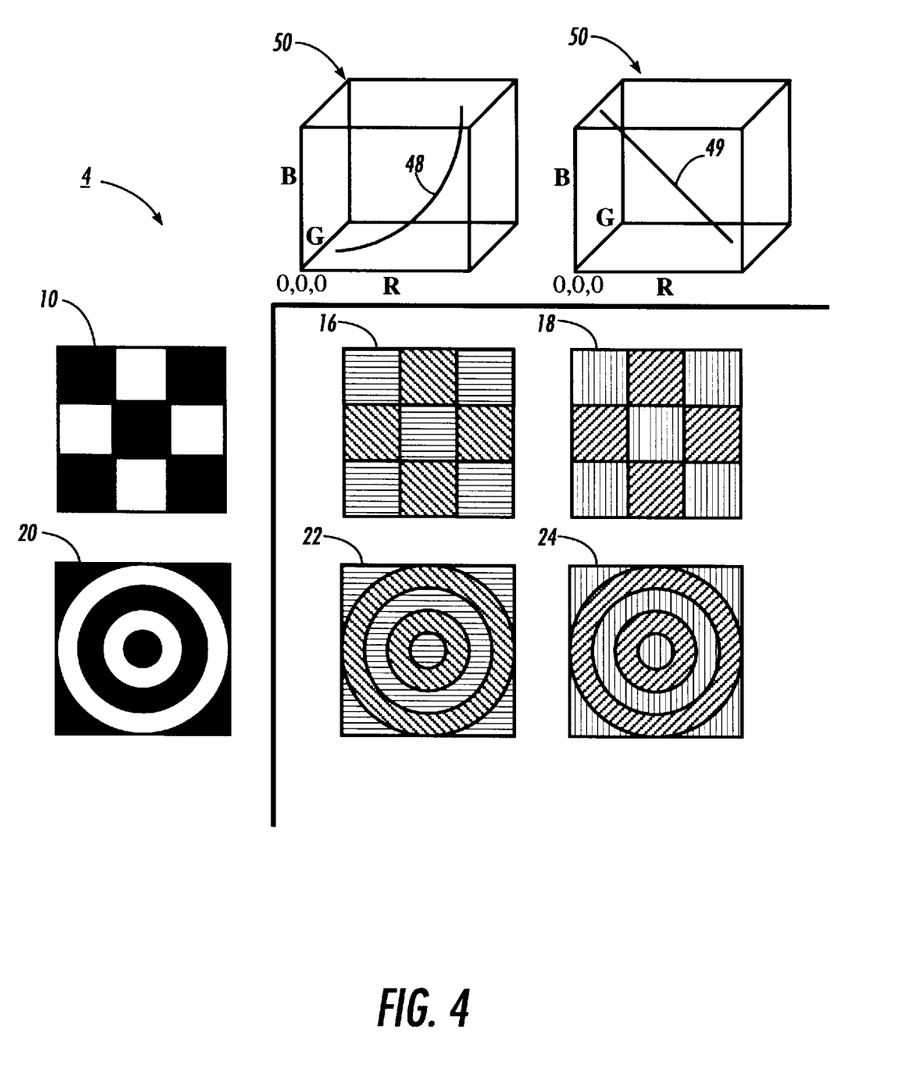
FIG. 4 is a graphical table illustrating the concept of the SCS model of the present invention that the spatial distribution of colors in a given input region is represented independently of their distribution in a subset of color space.

FIG. 4 illustrates the concept that the spatial structure of the image region may also vary independently of the color space representation in the space-color separable representation of the present invention. FIG. 4 shows graphical table 4 including color image regions 10 and 20 in row heading positions. Image region 10 and 20 are shown in black and white as each simply having the same two colors with sharp edge transitions between them but the color pattern in each image is intended to represent two colors that smoothly vary at the transitions; image regions 10 and 20 show the two colors as being distributed spatially in different patterns of concentric circles in image region 20 and in the checkerboard-like pattern of image region 10. Two color space subsets are shown as column headings: color space subset curve 48 and color space subset line 49. It can be seen that these color space subsets have different orientations and curvatures in color space 50, thus representing different subsets of colors. At the junction of each row and column in table 4 is an image region showing the resulting mapping of the colors in image regions 10 or 20 according to the color space subset approximation of subset 48 or 49. Image regions 16 and 22 show the colors produced by color space approximation 48, as indicated by the two types (horizontal and right-diagonal) of cross-hatching, distributed according to the spatial structure of the respective spatial structures of image regions 10 and 20, respectively. While it cannot be shown because of the limitations of the black and white drawings, it is to be understood of course, that there is smooth shading at the transitions between the two colors. Similarly, image regions 18 and 24 show the colors produced by color space approximation 49, as indicated by vertical and left-diagonal cross-hatching, distributed according to the spatial structure of the respective spatial structures of image regions 10 and 20, respectively. Again, the smooth shading at the transitions between the colors is omitted from image regions 18 and 24. It can be seen that the SCS representation of a color image region decomposes the region into its spatial and color space structures, and that these structures, once so decomposed, can be manipulated independently.

B. The Polynomial-Linear Implementation of the SCS Model

An illustrated embodiment of the SCS color image region representation will now be described wherein it has been assumed that the function g is a polynomial (i.e. in x and y) and the function h is linear, which means that color space subset S is either a point, line, plane, or the entire color space. The degree of the polynomial, and the dimension of S, can be selected to trade off between the accuracy of the approximation and the complexity of the functions. This implementation will be referred to as the polynomial-linear approximation, and is useful because, while the functions are simple and easy to work with, in combination they can adequately represent many types of regions found in natural images.

The description of this illustrated implementation presumes a knowledge of the fundamental principles of matrix algebra, in general, and computing singular value decompositions and pseudoinverses of matrices in particular. One of many useful texts in this regard is Golub and Van Loan, *Matrix Computations,* 2nd Ed., The Johns Hopkins University Press, Baltimore and London, 1989.

An embodiment of the present invention has been implemented in a software program on a Silicon Graphics Indigo Elan computer running the Irix operating system, available from Silicon Graphics, Inc. (SGI) of Mountain View, Calif. The software program implementing the invention is written in MATLAB language and program development environment available from The MathWorks, Inc., Natick, Mass. Information about MATLAB may be found in the publications available from The MathWorks entitled: *MATLAB Reference Guide*, The MathWorks, Inc., Natick, Mass., August 1992; and *MATLAB User's Guide*, The MathWorks, Inc., Natick, Mass., August 1992. Additional language resources are available at the World Wide Web site of The MathWorks, currently located at http://www.mathworks.com/home.html. The source code of this implementation, the copyright to which is owned by Xerox Corporation, is included in the Appendix herein immediately preceding the claims. The functional description of the polynomial-linear embodiment of the SCS model that follows is based on the software implementation included in the Appendix, although the software implementation may vary from this description in its use of variable names and organization of routines.

It will be apparent to those of skill in the art that a variety of programming languages and hardware configurations could readily be used in place of those in the illustrated embodiment based on the description herein without departing from the scope and intended utility of the present invention.

1. The basic mathematics of the polynomial-linear implementation of the SCS model The parameterized function that approximates the color-space structure of the image region defines a subspace of color space. The dimension of this subspace is denoted as k, and the parameter vector, which has dimension k, u. When k=1, the subspace is a line; when k=2, a plane, and when k=3, all of color space. The color-space approximating function is written as $$q=Au \quad (1)$$

where A is a 3×k matrix.

The function that approximates the spatial structure of the image is a vector of polynomials of degree d>0. This function maps image locations to the parameter vector u, which has dimension k, so the vector of polynomials has dimension k also. In the case of d=0, the SCS model is constant in the region and equal to the average color. In the case of k=d=1, the spatial approximation is given by $$u_1 = b_1 + b_2 x + b_3 y$$

which can be written in vector form as $$u_1 = (b_1 b_2 b_3) \begin{bmatrix} 1 \\ x \\ y \end{bmatrix} \quad (2)$$

$$= b^t z \quad (3)$$

Here. $b=(b_1 b_2 b_3)^t$ is the polynomial's coefficient vector, and $z=(1xy)^t$.

When $k>1$, there is a separate polynomial for each element of the parameter vector $u_j$. Each polynomial has its own coefficient vector, denoted $b_i$. Let B be the k×3 matrix $(b_1 b_2 b_3)^T$. Then the spatial approximation may be written as $$u = Bz \quad (4)$$

This notation allows polynomials of higher degree to be handled straightforwardly. The definition of z is generalized so that its elements are the basis functions of the polynomial of degree d. When d=1, the vector z has three elements: 1, x, y. If d=2, the elements $x^2$, xy, and $y^2$ are added. If d=3 the element $x^3$, $x^2 y$, $xy^2$ and $y^3$ are added. Let the function that maps x to z be denoted f so $z=f(x)$, and let the dimension of z be $r_d$. It is then easy to show that $r_d$ is defined by the recurrence relation $$r_1 = 3, \quad r_d = r_{d-1} + d - 1 \, d > 1. \quad (5)$$

Given this redefinition of z as being a function of x, the previous notation may be used to generalize the definition of the spatial approximating function to polynomials of arbitrary degree. Equation (4) holds as before. Some dimensions change, however: z now has dimension $r_d$, and the matrix B, which maps z to the k-vector u, is now $k \times r_d$. Because $d \geq 1$, and $r_1 = 3$, it follows that $r_d \geq 3$.

The SCS approximating function maps image locations to colors by composing the spatial approximation given by Equation (4), which maps image locations to parameter values, with the color-space approximation given by Equation (1), which maps parameter values to colors. Substituting the expression for u in Equation (4) into Equation (1) gives $$q = ABz, \quad (6)$$

and letting C=AB, this may be rewritten as $$q = Cz. \quad (7)$$

The matrix C contains all of the parameters that describe the SCS approximating function that maps image region locations to colors. Because C is the product of A, which is 3×k, with B, which is k×$r_d$, C is 3×$r_d$ but can have rank no greater than min(3, k, $r_d$). Because $k \leq 3$ and $r_d \geq 3$, min(3, k, $r_d$)=k, and thus C can have rank no greater than k.

Note that when the subspace defined by the color-space approximation is three-dimensional (i.e., k=3), there is no approximation in color space. In this case, the SCS model approximates only the spatial structure of the image region.

2. Computing the Polynomial-Linear Implementation of the SCS Model

Figure 5:
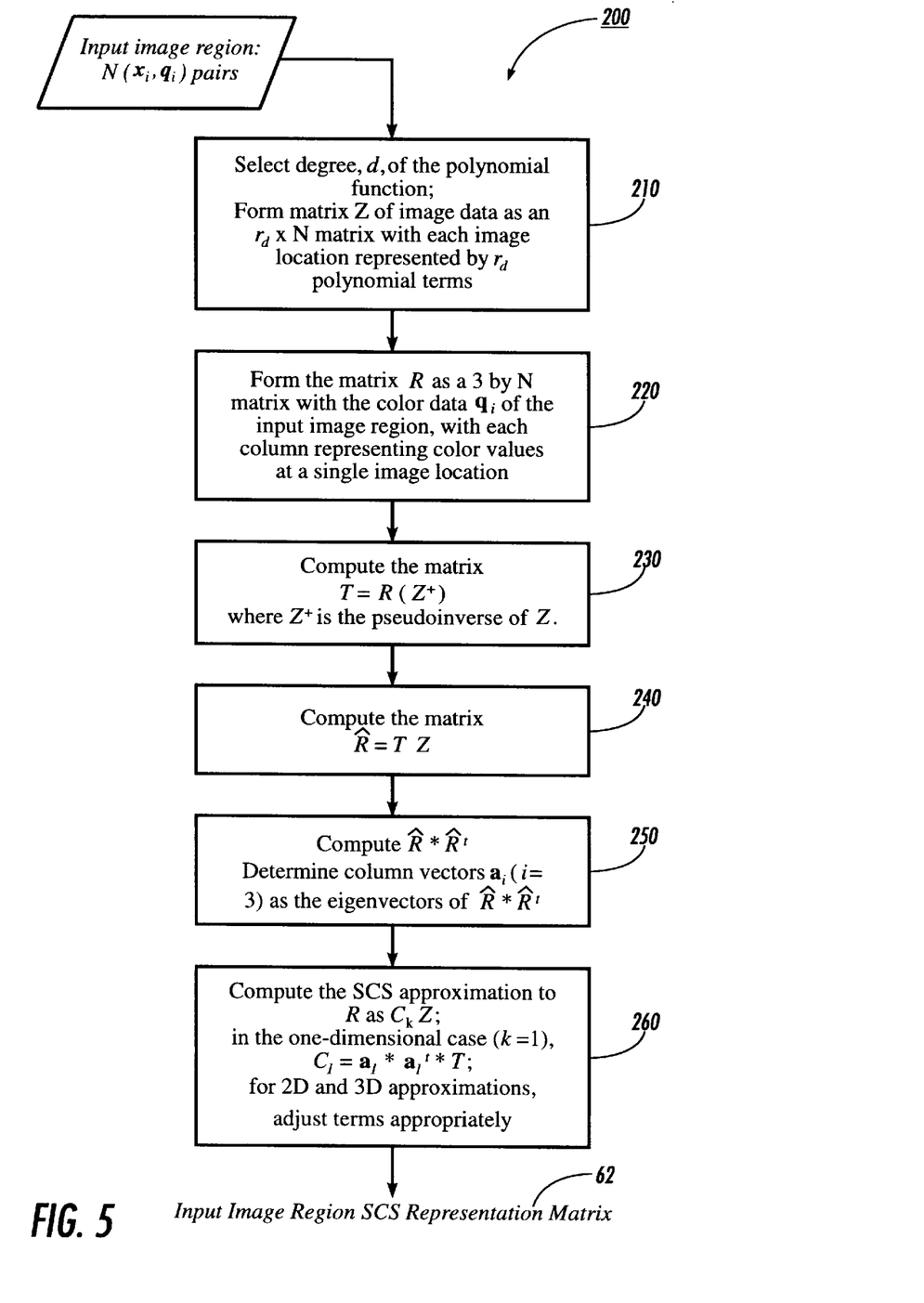
FIG. 5 is a flowchart illustrating an implementation of the SCS model according to the present invention, using a polynomial function for fitting the input image region to the parameter space, and a linear function for fitting the colors in a color space to a selected subspace.

FIG. 5 is a flowchart illustrating the basic steps of the operation for producing the polynomial-linear representation of the SCS model. The input image region is given, and is defined by the set $(x_i, q_i)$, with each $x_i$ being an image location in the image region specified in (x, y) and each $q_i$ being a color in RGB color space at the respective image location, as defined above.

The initial step, in box 210, is to choose the degree of the polynomial approximation (function g), which maps the image points to the parameter space, and to form a matrix of the image region data. To illustrate the algorithm, degree 2 is used, but any degree is possible. Form the matrix Z, $$Z = \begin{bmatrix} 1 & 1 & \ldots & 1 \\ x_1 & x_2 & \ldots & x_N \\ y_1 & y_2 & \ldots & y_N \\ x_1^2 & x_2^2 & \ldots & x_N^2 \\ x_1 y_1 & x_2 y_2 & \ldots & x_N y_N \\ y_1^2 & y_2^2 & \ldots & y_N^2 \end{bmatrix} \quad (8)$$

such that if there are N $(x_i, q_i)$ pairs in the image region, each image location is represented by a column of parameters, and the matrix Z has dimensions of 6 by N.

Again assuming N $(x_i, q_i)$ pairs in the image region, the matrix R is formed, in box 220, with the color data $q_i$ of the input image region:

$$R = \begin{bmatrix} r_1 & r_2 & \ldots & r_N \\ g_1 & g_2 & \ldots & g_N \\ b_1 & b_2 & \ldots & b_N \end{bmatrix} \quad (9)$$

such that R is a 3×N matrix, with each column representing the color values at a single image location.

Then, in box 230, the matrix T is computed as $$T = R(Z^+), \quad (10)$$

where $Z^+$ is the pseudoinverse of Z.

Now the matrix $\hat{R}$ is computed as $$\hat{R} = TZ. \quad (11)$$

Next, let $a_i$, i=3, be the eigenvectors of $\hat{R} * \hat{R}^t$, where t denotes the operation of matrix transposition, or equivalently the left singular vectors of $\hat{R}$, in descending order of eigenvalue (or singular value). The $a_i$ are column vectors. This operation is represented in box 250 of FIG. 5.

Finally, as represented in box 260, the approximation to R is computed as $C_k Z$, where k is the dimension of the subspace in color space, and can range from 1 to 3. In the one-dimensional case, $$C_1 = a_1 * a_1^t * T, \quad (12)$$

and the two-dimensional case, $$C_2 = (a_1 \, a_2) * \begin{bmatrix} a_1^t \\ a_2^t \end{bmatrix} * T, \quad (13)$$

where $(a_1 \, a_2)$ is a 3×2 matrix. The three-dimensional case, $C_3$, simply equals the matrix T but can be written analogously to the one- and two-dimensional cases.

In this polynomial—linear implementation of SCS model 2 (FIG. 1), the function h, here a linear function, is represented by matrix $a_1$ (a1×3 matrix), $(a_1 \, a_2)$ (a2×3 matrix), or $(a_1 \, a_2 \, a_3)$ (a 3×3 matrix) in the one-, two- and three-dimensional cases respectively. This is the matrix A from the previous section. The polynomial function g is represented by the matrix $a_1^t * T$ (a1×6 matrix) in the one-dimensional case; by $$\begin{bmatrix} a_1^t \\ a_2^t \end{bmatrix} * T$$

(a 2×6 matrix) in the two-dimensional case; and by $$\begin{bmatrix} a_1{}^t \\ a_2{}^t \\ a_3{}^t \end{bmatrix} * T$$

(a 3×6 matrix) in the three-dimensional case. This is matrix B from the previous section.

The dimension of the color space subspace, k, can then be chosen based on whether the decrease in error as k increases justifies the additional parameters required to represent C and the additional computation that must be performed each time the approximating function is evaluated. The criteria for this choice depend on the requirements of the application that computes the SCS function.

C. The General SCS Model

The polynomial-linear implementation of SCS model 2 is a specific implementation of a more general approach to defining the model; the polynomial-linear implementation is specific in the sense that the forms of the functions g and h, are given as being polynomial and linear, respectively, and the criteria used to fit the functions to the data are specifically given. More generally, however, other types of functions may be used, and other suitable criteria may be used to fit a selected function to the given input data.

Figure 6:
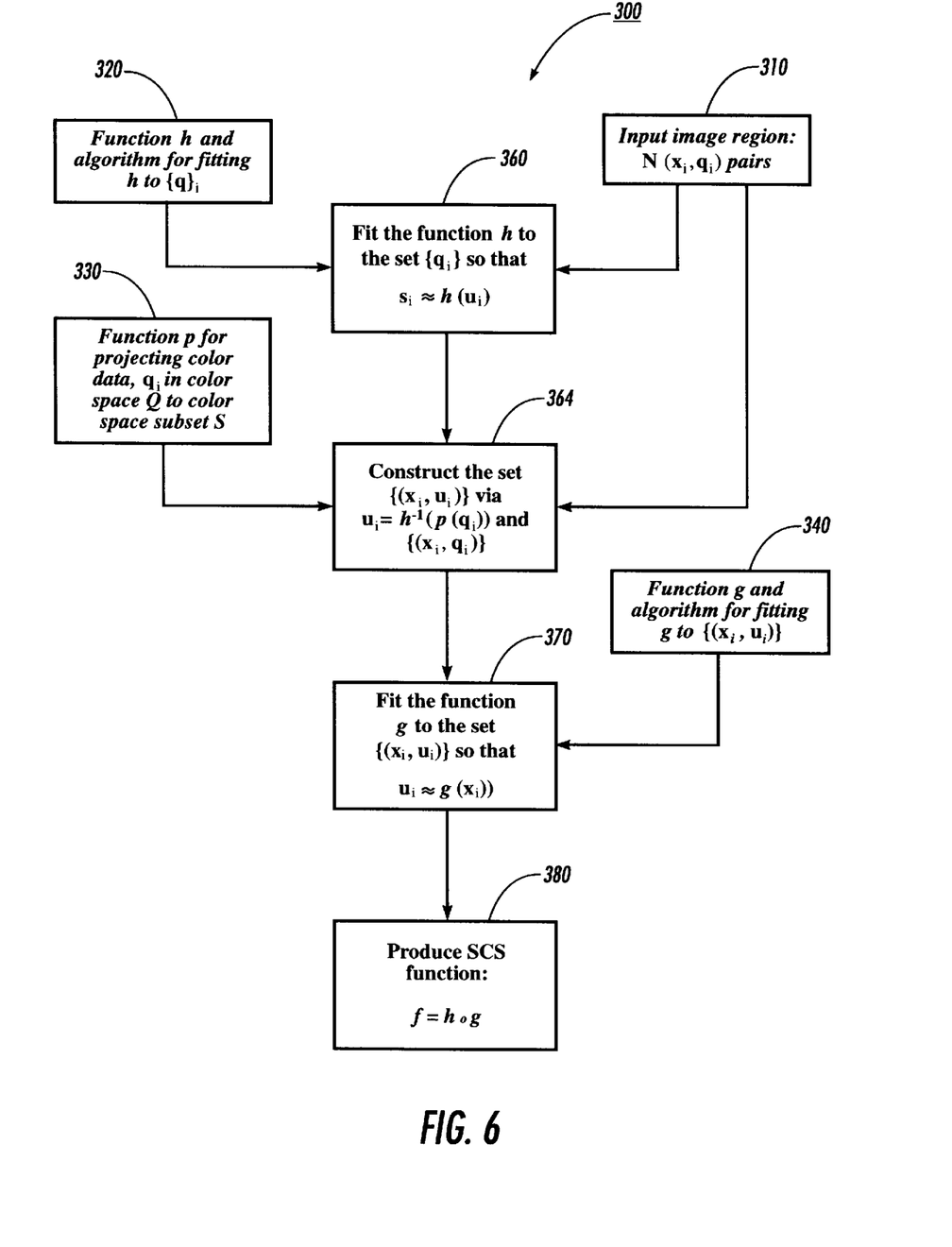
FIG. 6 is a flowchart illustrating the SCS model in more general terms, showing how the major inputs are operated on to produce the overall SCS function.

FIG. 6 shows a flowchart of operation 300 for implementing a more general SCS model for producing SCS function 60 of FIG. 1 for representation of color image regions. Operation 300 requires that the several inputs be provided including data 310 representing a region of a color image to be represented by the SCS model, defined as the set $\{(x_i, q_i)\}$, and the function h and an algorithm for fitting h to the color data, $q_i$, collectively referenced in FIG. 6 by reference numeral 320. Also required as input to general SCS model 300 are: the function p that maps the $q_i$ to the $s_i$ which are the approximated colors, collectively referenced in FIG. 6 by reference numeral 330; for example, $p(q_i)$ could be the point $s_i$ on or in S, the color space subset, that's closest to $q_i$; and the function g and an algorithm for fitting g such that $g(x_i)$ approximates $u_i$ in the parameter space U, collectively referenced in FIG. 6 by reference numeral 340.

Examples of what is meant by a fitting algorithm in the context of the general SCS model are as follows: Suppose the goal is to approximate the set $\{(a_i, b_i)\forall$ with a function f such that $f(a_i) \approx b_i$. This usually requires that the function f depend on a vector of parameters w, so that f is a function of both $a_i$ and w, i.e. $f(a_i; w) \approx b$ (where the semicolon indicates that $a_i$ and w have different roles.) An algorithm that fits f to the data computes the w to minimize some measure of the distances between the $f(a_i; w)$ and the $b_i$.

In the case of the function h that fits the color space subset S to color space Q, where the data are the set $\{q_i\}$, points in a three-dimensional space, and the corresponding points in the parameter space are unspecified, one strategy for finding h is to find an implicit function f such that $f(q; w)=0$, where w is a vector of parameters, and $S=\{q|f(q; w)=0\}$. In this case, w is chosen to minimize some measure of the distances from the $q_i$ to the nearest point on S. The function f must be parameterizable by another function, say h, so that $h(u_1; w) \approx q_i$.

The general algorithm is stated and illustrated in FIG. 6 as follows: Choose the dimension of parameter space U and fit the function h to the set $\{q_i\}$ so that $h(u_i) \approx s_i \approx q_i$. The inverse of h is denoted $h^{-1}$. Then, construct the set $\{(x_i, u_i)\}$ via $u_i = h^{-1}(p(q_i))$ and $\{(x_i, q_i)\}$, that is, the set $\{(x_i, u_i)\} = \{(x_i, h^{-1}(p(q_i))\}$. Now, fit g to the set $\{(x_i, u_i)\}$ so that $u_i \approx g(x_i)$.

Then the overall function f, such that $f(x_i) \approx s_i \approx q_i$, is just the composition of g and h, written as $h \circ g$.

D. Applications of the SCS image region representation

1. Image Editing Operations: Affine transformations of image locations

In the polynomial-linear implementation of the SCS model, when image locations $x_i$ are transformed by an affine transformation, the SCS approximating function can easily be expressed in terms of the transformed locations. Affine transformations are any combination of rotating, scaling, shearing, or translating of the image locations. An affine transformation of image locations is written as $$x'=Ex+t, \tag{14}$$

where E is a 2×2 matrix that represents the rotation, scale, and shear, t is a vector of dimension 2 that represents the translation, and x' is a vector of dimension 2 that contains the transformed image locations.

The form of the SCS model in Equation (7) is invariant with respect to affine transformations, and therefore there exists a matrix C' such that $$q=C'z', \tag{15}$$

where $z'=f(x')$. If we can find an expression for C', we can express the SCS model in terms of the transformed image locations.

The set of polynomials in x of degree d is closed under nondegenerate affine transformations of x. This implies that for any affine transformation given by S and t, there exists a $r_d \times r_d$ matrix G such that $$z'=Gz. \tag{16}$$

If S is nonsingular, so is G.

Details follow for the cases d=1 and d=2. When d=1, Equation (16) becomes $$\begin{bmatrix} 1 \\ x' \\ y' \end{bmatrix} = \begin{bmatrix} 1 & 0 & 0 \\ e_{11} & e_{12} & t_1 \\ e_{21} & e_{22} & t_2 \end{bmatrix} \begin{bmatrix} 1 \\ x \\ y \end{bmatrix} \tag{17}$$

When d=2, G becomes (z' and z are omitted to save space)

$$G = \tag{18}$$

$$\begin{bmatrix} 1 & 0 & 0 & 0 & 0 & 0 \\ e_{11} & e_{12} & t_1 & 0 & 0 & 0 \\ e_{21} & e_{22} & t_2 & 0 & 0 & 0 \\ t_1^2 & 2e_{11}t_1 & 2e_{12}t_1 & e_{11}^2 & 2e_{11}e_{12} & e_{12}^2 \\ t_1t_2 & e_{11}t_2+e_{21}t_1 & e_{21}t_2+e_{22}t_1 & e_{11}e_{21} & e_{11}e_{22}+e_{21}e_{21} & e_{12}e_{22} \\ t_2^2 & 2e_{21}t_2 & 2e_{22}t_2 & e_{21}^2 & 2e_{21}e_{22} & e_{22}^2 \end{bmatrix}$$

To express q in terms of z', Equation (16) is used to write $z=G^{-1}z'$, and then this expression is substituted for z into Equation (7):

$$q = Cz \tag{19}$$
$$= CG^{-1}z', \tag{20}$$
$$= C'z', \tag{21}$$

where $C'=CG^{-1}$, which is the expression for C' being sought.

Figure 7:
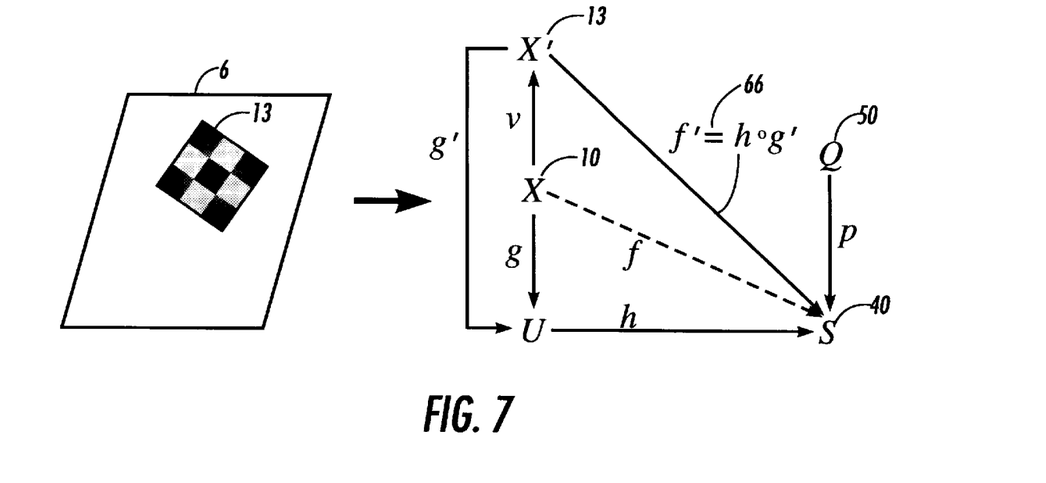
FIG. 7 illustrates how image transformations to an image region may be accomplished by manipulating the SCS representation for the image region.

FIG. 7 illustrates the concept of manipulating the image structure of an color image region separately from its color space structure. Image 6 shows color image region 13, which is a rotated and scaled version of color image region 10 of FIG. 2. In the SCS model, image space X' represents image region 13 in its rotated and scaled version; a transformation function v transforms image region 13 to image region 10, function g' fits the image locations in X to parameter space U. The composition of g' with h produces new SCS function 66 f', the composition h∘g', which is also a matrix representation of the color image region.

2. Color Editing using the Polynomial-Linear SCS Function

Representing color image regions as an SCS function makes it easy to edit colors in the image region by applying linear transformations to them; applying such transformations does not alter the spatial structure of the region. Linear transformations of color have a variety of uses in this context. When the color-space subset function h defines a line or plane in color space, a linear transformation of color space serves to transforms this line or plane to a new line or plane. Such a transformation might be chosen to increase the aesthetic appeal of the colors in the region. Another use for linear transformations of color is to simulate changing the color of the illumination in a scene. This is a common operation in systems for color correction.

The SCS function in the polynomial-linear implementation just discussed can easily be expressed in terms of the transformed colors. Suppose our linear transformation of color is given by $$q' = Wq \qquad (22)$$

where q' is a transformed color, and W is a 3×3 matrix. To express the SCS function given by Equation (7), a 3×$r_d$ matrix C' must be found such that $$q' = C'z. \qquad (23)$$

Substituting the expression for q in Equation (7) into Equation (22) gives $$\begin{aligned} q' &= Wq & (24) \\ &= WCz, & (25) \\ &= C'z, & (26) \end{aligned}$$

where C'=WC, which is the expression for C' being sought.

Figure 8:
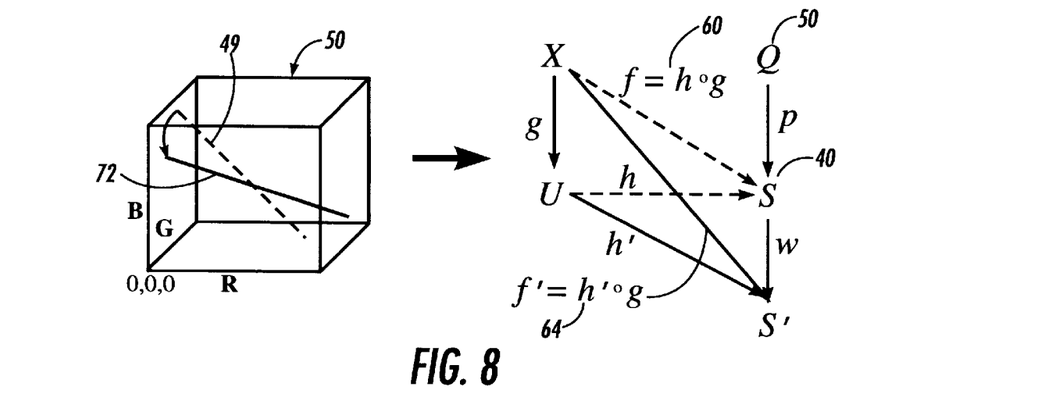
FIG. 8 illustrates how color editing by applying linear transformations to original colors in an image region may be accomplished by manipulating the SCS representation for the image region.

Thus, applying a linear color transformation directly to the SCS function, f, efficiently changes the colors in the image region without actually applying the transformation to each color individually in the region. FIG. 8 shows color space 50 with color space subset 49 as the subset S used to produce the SCS representation for a given image region according to the polynomial-linear implementation; color space subset 49 is shown as a dashed line to show that it is being changed. Changing the colors in the image region to fall on color space subset 72 is accomplished by applying a transformation function, w, to the original color space subset, S, to produce S'; function h' fits parameter space U to new color space subset S', and the composition of h' with g produces new SCS function f', the composition h'∘g, which is also a matrix representation of the color image region.

3. Color editing and image transformations in the general SCS model

In the general case, the SCS model handles arbitrary nonsingular transformations of image coordinates and facilitates color editing because it handles arbitrary transformations of color coordinates. The exposition here is analogous to that in the polynomial-linear case described in the section above.

Suppose the transformation of image coordinates is x'=v(x). Let the new SCS approximation be given by q=f(x'). Since u=g(x), and x=$v^{-1}$(x'), it follows that u= g($v^{-1}$(x')). Let g'=g∘$v^{-1}$, and since q=h(g(x)), it follows that q=h(g'(x')), and f=∘g'=h∘g'h∘v$^{31}$ $^1$.

This shows that the SCS model handles arbitrary nonsingular transformations of image coordinates.

Now suppose the transformation of color coordinates is q'=w(q). Let the new SCS approximation be given by q'=f(x). Since q=f(x), it follows that f(x)=w(f(x)), and f=w∘f. This shows that the SCS model handles arbirtrary transformations of color coordinates.

4. High Level Data Structure Representations of Images and Image Structure Maps

As can be seen from the polynomial-linear implementation, the SCS model of color image region representation is a compact representation relative to the original input set $(x_i, q_i)$}, and is suitable for high-level data structure representations of color images. A color image may be represented by data indicating an SCS approximating function for each region in the image together with the location of that region relative to other regions.

An "image structure map" or ISM is a particular kind of high-level image representation for representing a variety of types of images, including color images. An image structure map is described in detail in copending, commonly assigned U.S. patent application Ser. No. 08/581,660, which is hereby incorporated by reference for all that it teaches. An ISM is a partition data structure that accurately and explicitly represents the geometry, topology and signal properties of regions in an original image and allows for efficient and accurate spatial indexing of the image and those regions. A partition data structure is defined as a data structure that includes data indicating the vertices, region boundaries and regions of an original image, the vertices adjacent to each region boundary, and the region boundaries and vertices adjacent to each region. A partition data structure, also referred to as simply a "partition," of an original image indicates data describing both the geometric and the topological properties of the set of region boundaries of the original image. The geometric properties include the positions of the region boundaries in the image, typically specified by their endpoints, and the geometric definition of the region boundaries; the topological information indicates the incidence and adjacency of the vertices, region boundaries and regions that comprise the partition. The partition produced for a given original image is a function of the region boundaries provided as input to the partition building process; thus, an original image may be represented by different partitions, and there is no single unique partition for a given original image.

The image structure map representation is dynamically produced from an input image using a dynamic, incremental planar partition operation that partitions the input image into regions according to a function of a smoothly varying property of the region and using input image region boundary data that may be a combination of automatic image segmentation input and user-supplied image segmentation input. The incremental nature of the operation that produces the image structure map means that the partition of the image into regions is built by adding one region boundary at a time into the data structure; the dynamic nature of the operation that produces the image structure map means that the partition of the image is built without a priori knowledge of all the region boundary data items that are eventually to be included in the partition, and that both the region structures as well as the signal property descriptors for the regions can be altered or edited at any time.

Image information computed from the image structure map representation, such as the locations of structures and their geometric and topological relationships to other structures, is accurate because the operation that builds the partition of the image insures that intersections and endpoints of image region boundaries have locations specified in machine representable numbers. Locations of the intersections and the endpoints of input region boundaries are rounded to representable points using a mathematically rigorous rounding operation. The rounding operation perturbs all vertices of the image partition to lie on representable points on an integer grid. One consequence of this perturbing is the breaking up of an original image boundary into pieces, called fragments. In order to ensure that the perturbed partition has a topology consistent with the original image, additional points on image boundaries in the partition are perturbed to the grid as well; the rounding operation specifies which points these are and to which representable points they should be perturbed. In the end, all vertices, edges, and faces of the resulting perturbed partition have exact representations with finite arithmetic. The original locations of the input region boundaries provided by a user or by an automatic image segmentation operation are stored in the image structure map to ensure that the rounded image region boundaries are topologically consistent with the original input region boundaries. One embodiment of an ISM has the form of a vertical cell decomposition that is mathematically robust, topologically consistent with the original image and is able to be modified dynamically—that is, without recomputing the entire ISM when a change is made.

An image structure map representation is compact in comparison with an original image data structure in the sense that the image structure map represents a smoothly varying signal property in each image region in a very compact form, thus eliminating much redundancy in the image signal. The space-color separable function of the present invention may be used to represent color image regions in an image structure map data structure representation of a color image; the SCS function effectively represents the color for an entire region of pixel locations with a matrix of parameters. The advantages of a compact image representation are thus achieved without significant loss of image information content; the image structure map makes the geometric and topological structure of an image explicit, and the SCS function approximates the spatial and color space distribution of colors in each image region effectively. An image rendered from the image structure map still conveys substantial information about the objects in the original image, their spatial relationships to each other, and the signal properties of their regions.

Figure 9:
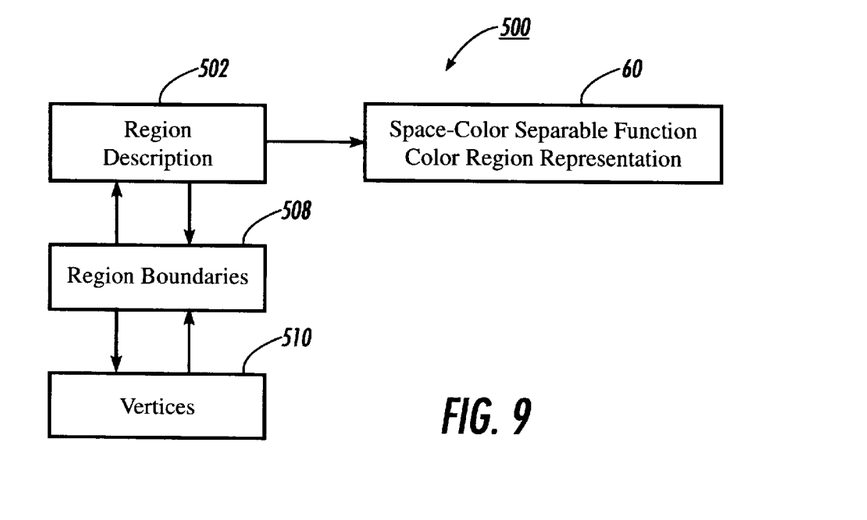
FIG. 9 shows a block diagram of a high-level data structure representation of a color image using the SCS function to represent color image regions.

FIG. 9 shows a block diagram of an image structure map data structure representation of a color image. Each region description data item 502 indicates the region boundaries 508 comprising a region; each region boundary in turn indicates the locations of its vertices 510. Each region description data item 502 indicates the SCS function 60 representing the color image region.

The ISM may serve as the basis for an image interaction system in which a user interacts with a rendered view of an original image that is produced from the ISM data structure. The rendered view of the original image represents the geometry and topology of the original image as represented in the ISM. The user interacts with the rendered view to make alterations to, or to query, the structures in the ISM. The user may also modify the ISM by interacting directly with a displayed view of the original image. The user may further invoke automatic operations to be performed using the original image data structure that produce image region data, such as the SCS functions and boundary data, that may be used to modify the ISM. In addition, color image region editing using displayed views of a color space and a selected color space subset, such as suggested in the discussion of color editing above, may also be part of a complete image interaction system that uses an image structure map as a high-level representation of an image. An image interaction system implemented in this manner takes full advantage of automatic computation methods to capture the geometric and topological properties of an image while permitting a user to employ human perceptual skills to augment the automatic operations.

E. The Machine Environment of the Invention

Figure 10:
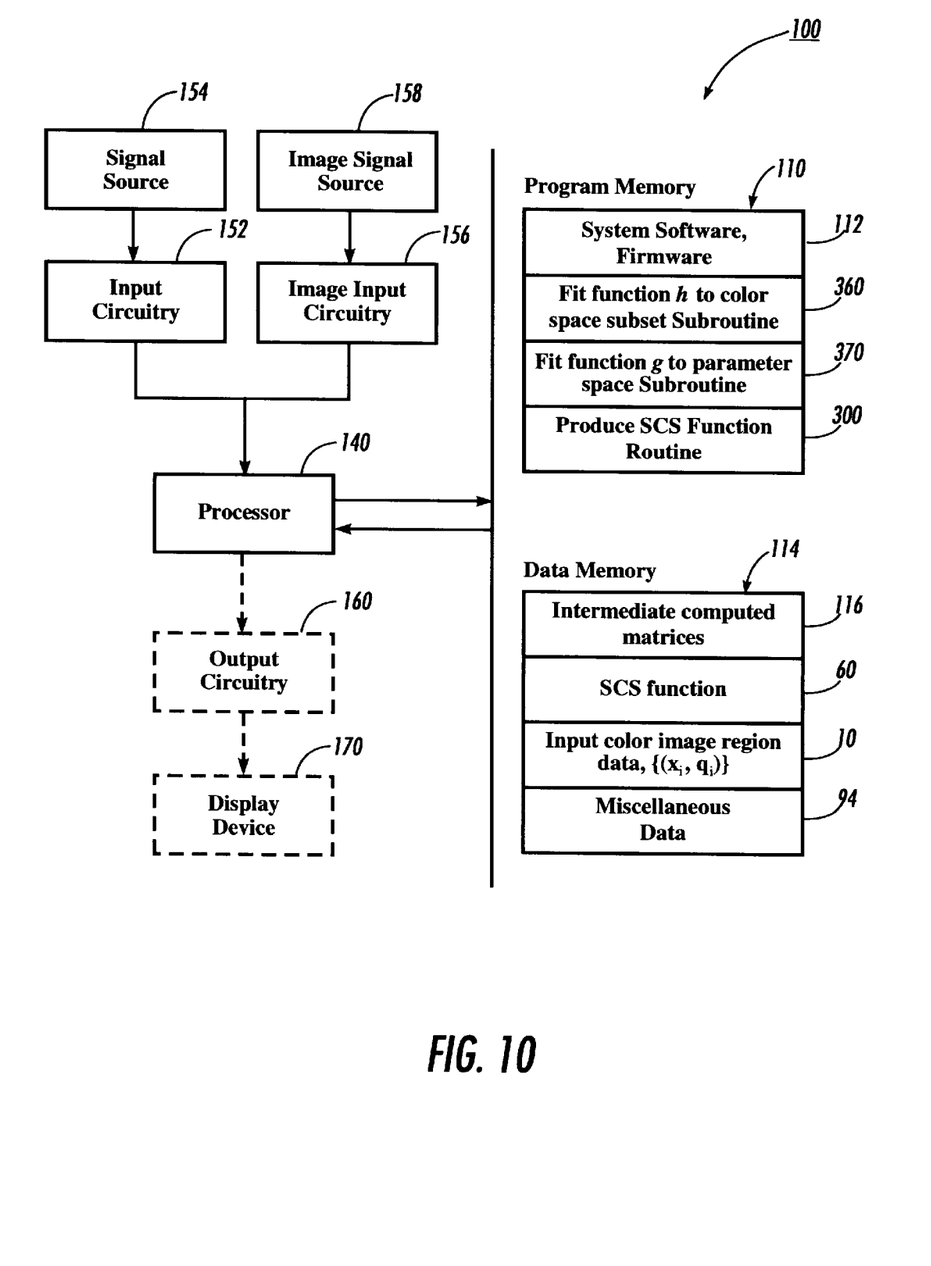
FIG. 10 is a simplified block diagram illustrating a machine in which the present invention may be used.

The SCS color image region representation is intended to be implemented in any processor-controlled machine having the common components, characteristics, and configuration of machine 100 shown in FIG. 10. Machine 100 is a generalized, processor-controlled machine and is not inherently related to any particular processor, machine, system or other apparatus. The machine or system may be specially constructed and optimized for the purpose of carrying out the invention, or it may comprise a general purpose computer selectively activated or reconfigured by a computer program stored in the computer, or it may be a combination of a general purpose computer and auxiliary special purpose hardware. When a machine such as machine 100 is suitably programmed to embody the present invention, the machine is not a standard or known configuration.

Generally, the image definition data structure defining a color image region that is input to the present invention is provided from an image source such as data memory 114 or image signal source 158. Image signal source 158 may be any image capture device, such as a scanning device, a digital camera, or an interface device that produces a digital image definition data structure from another type of image signal. When the image is provided by image signal source 158, it is forwarded via image input circuitry 156 to processor 140 and may be stored in data memory 114.

Machine 100 includes input circuitry 152 for receiving signals from a signal source 154. Such sources include operations performed by processor 140 or other processors (not shown) that communicate signals to processor 140, and user interaction devices controllable by a human user that produce signals in response to actions by the user, such as a pointing device or a keyboard. Another type of user interaction device is a stylus device that the user moves over a special data collecting surface, which might be the display area of a display device (not shown). These input signals are also forwarded via input circuitry 152 to processor 140 and may be stored in data memory 114. Machine 100 may, but need not, include a conventional display device 170 capable of presenting images, such as a cathode ray tube, a liquid crystal display (LCD) device, a printing device, or any other device suitable for presenting images.

Processor 140 operates by accessing program memory 110 to retrieve instructions, which it then executes. Program memory 110 includes SCS function instructions 200 that implement the functions shown in flowchart 200 of FIG. 5 when processor 140 produces the SCS function according to the polynomial-linear implementation; or program memory 110 may include SCS function instructions 300 that implement the functions shown in flowchart 300 of FIG. 6 when processor 140 carries out an implementation other than the polynomial-linear implementation of the SCS function. Program memory 110 includes instructions for the subroutines needed to produce the space-color separable representation of the input color image region according to SCS function instructions 300. During execution of the instructions, processor 140 may access data memory 114 to obtain or store data necessary for performing its operations. Data memory 114 stores the image data 10 defining the input color image region. Data memory 114 also stores the computed SCS function 60, and intermediate matrix computations 116 such as matrices Z, R, R̂ and T produced during the polynomial-linear implementation. Data memory 114 also stores various other miscellaneous data 94.

The actual manner in which the physical components of machine 100 are connected may vary, and may include hardwired physical connections between some or all of the components, as well as connections over wired or wireless communications facilities, such as through remote or local communications networks and infrared and radio connections. Program memory 110 or data memory 114, for example, may include memory that is physically connected to processor 140 as local memory, or that is remotely accessible to processor 140 by means of a wired or wireless communications facility (not shown.)

F. The Software Product of the Invention

Figure 11:
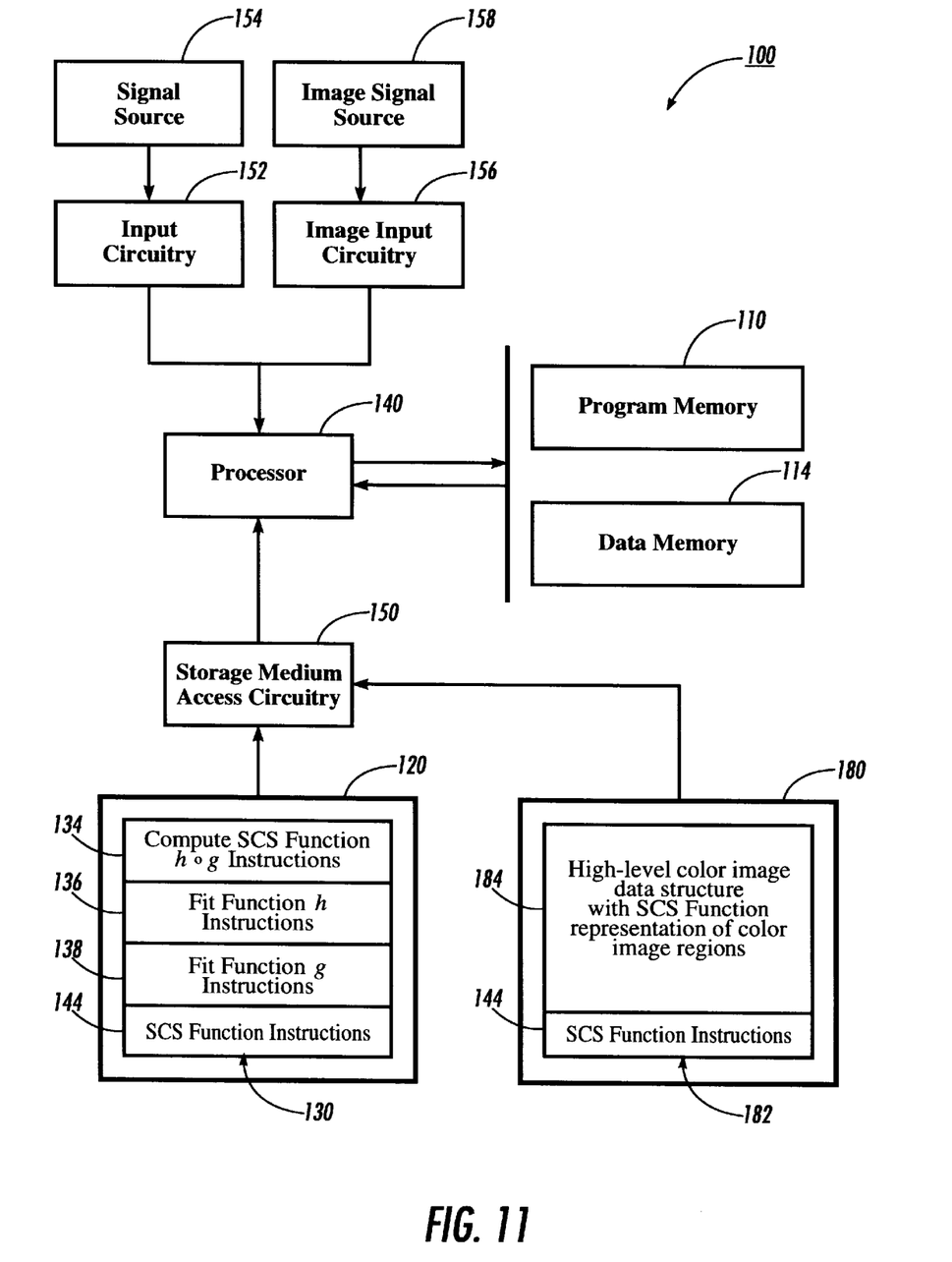
FIG. 11 is a block diagram schematically illustrating the software products of the present invention and their use in conjunction with a suitably configured machine.

FIG. 11 shows two software products 120 and 180, articles of manufacture that can be used in a machine that includes components like those shown included in machine 100. Software products 120 and 180 include data storage medium 130 and data storage medium 182, respectively, each of which can be accessed by storage medium access circuitry 150. Data storage medium 130 stores instructions for executing the method of the present invention for producing a space-color separable representation of a color image region according to the invention illustrated in the flowcharts of FIGS. 5 or 6; data storage medium 182 stores a data structure representation of a color image in which color image regions are represented by SCS functions, and optionally may also store SCS function instructions.

Either or both software products 120 and 180 may be commercially available to a consumer in the form of a shrink-wrap package that includes data storage medium 130 or data storage 182 and appropriate documentation describing the product. In that case, a data storage medium is a physical medium that stores instruction data in the case of software product 120 or a color image data structure in the case of software product 180. Examples of data storage media include magnetic media such as floppy disks, diskettes and PC cards (also known as PCMCIA memory cards), optical media such as CD-ROMs, and semiconductor media such as semiconductor ROMs and RAMs. As used herein, "storage medium" covers one or more distinct units of a medium that together store a body of data. For example, a set of disks storing a single body of data would be a storage medium. "Storage medium access circuitry" is circuitry that can access data on a data storage medium. Storage medium access circuitry 150 may be contained in a distinct physical device into which a data storage medium is inserted in order for the storage medium access circuitry to access the data stored thereon. Examples of storage medium access devices include disk drives and CD-ROM readers. These may be physically separate devices from machine 100, or enclosed as part of a housing of machine 100 that includes other components.

Storage medium access circuitry 150 may also be incorporated as part of the functionality of machine 100, such as when storage medium access circuitry includes communications access software and circuitry in order to access the instruction data or the color image data structure on the data storage medium when it is stored as part of a remotely-located storage device, such as a server. Software products 120 and 180 may be commercially or otherwise available to a user in the form of a data stream indicating instruction data for producing the SCS function for a given input color image region according to the present invention, in the case of product 120, or indicating a color image data structure in which color image regions are represented by SCS functions, in the case of product 180, that is transmitted to the user over a communications facility from the remotely-located storage device. In this case, both articles 120 and 180 are embodied in physical form as signals stored on the remotely-located storage device; the user purchases or accesses a copy of the contents of the desired data storage medium containing either the instructions for performing the present invention or containing a color image data structure, but typically the user does not purchase or acquire any rights in the actual remotely-located storage device. When either software product 120 or 180 is provided in the form of a data stream transmitted to the user over a communications facility from the remotely-located storage device, instruction data or the image data structure stored on the data storage medium is accessible using storage medium access circuitry 150. Alternatively, a data stream transmitted to the user over a communications facility from the remotely-located storage device may be stored in some suitable local memory device of machine 100, which might be program memory 110, data memory 114, or a data storage medium locally accessible to machine 100 (not shown), which would then also be accessible using storage medium access circuitry 150.

In the case of software product 120, data storage medium 130 stores instruction data which is provided to processor 140 for execution when the method for producing the SCS representation of a color image region is to be used. The stored data includes SCS function instructions 144; when these instructions are provided to processor 140, and processor 140 executes them, the machine is operated to perform the operations for producing an SCS function representation of a given input color image region, as represented in flowchart 200 of FIG. 5, or in flowchart 300 of FIG. 6.

Stored SCS function instructions 144 include the component operations of producing the SCS function, shown as instructions 138, 136 and 134; when these instructions are provided to processor 140, and processor 140 executes them, the machine is operated to perform the component operations shown in flowchart 300 in FIG. 6, or the component operations shown in flowchart 200 of FIG. 5.

In the case of software product 180, data storage medium 182 stores high-level color image data structure 184 with each color image region being represented by an SCS function. When this color image data structure is provided to processor 140, processor 140 may execute a rendering operation to display the color image using data structure 184, or may perform some other operation using data structure 184; for example, processor 140 may execute image interaction instructions that permit a user to interact with color image data structure 184. Data storage medium 182 may optionally also store SCS function instructions 144 for operating machine 100 to perform the operations for producing an SCS function representation of a given input color image region.

While the present invention has been described in conjunction with a specific embodiment, this description is not intended to limit the invention in any way. Accordingly, the invention as described herein is intended to embrace all modifications and variations that are apparent to those skilled in the art and that fall within the scope of the appended claims.

SOURCE CODE APPENDIX

Copyright Xerox Corporation. All Rights Reserved. Polynomial-Linear Implementation; MATLAB.

% Given matrices R and Z as described in the algorithm.

```
Zpseudo=pinv(Z);
T=R*Zpseudo;
Rhat=T*Z;
```

% Compute Singular Values of Rhat.

[u,s,v]=svd(Rhat);
% Extract eigenvectors of Rhat.
a1=u(:,1); % eigenvector of Rhat with biggest eigenvalue.
a2=u(:,2); % eigenvector of Rhat with second biggest eigenvalue.
a3=u(:,3); % eigenvector of Rhat with third biggest eigenvalue.
% Compute A and B matrices for one-, two-, and three-dimensional approxs.
A1=a1;
A2=[a1 a2];
A3=[a1 a2 a3];
B1=a1'*T;
B2=[a1';a2']*T;
B3=[a1';a2';a3']*T;
% Compute C matrices: C1 one-dimensional, C2 two-dimensional % C3 three-dimensional.
C1=A1*B1;
C2=A2*B2;
C3=A3*B3;

What is claimed is:

1. A method for operating a processor-controlled machine to compute a function representing original color values of original image locations in an image region of a color image; the machine including memory for storing data; the data including image definition data defining an image and instruction data; and a processor connected for accessing the image definition data, and for accessing the instruction data stored in the memory for operating the machine; the method comprising:

obtaining a plurality of image region data items indicating image definition data defining an input color image region; each image region data item indicating coordinate values of a respective original image location in the input color image region and an original color value of the respective original image location;

computing a first function to represent a spatial image structure of the input color image region; the first function mapping each coordinate value indicating an original image location in the input color image region to a point in a parameter space;

computing a second function to represent a color space subset of a color space structure of the input color image region; the second function mapping each point in the parameter space to a color space location in the color space subset; and computing the composition of the first and second functions to produce a third function, referred to as a space-color separable function, for mapping coordinate values of the input color image region to color values in the color space subset; the space-color separable function approximating the original color values and the original image locations in the input color image region; the space-color separable function, when used in place of the image region data items to represent the input color image region, producing a rendered color image region substantially similar in appearance to the input color image region.

2. The method of claim 1 for operating a processor-controlled machine to compute a function representing original color values of original image locations in an input color image region further including, when the original color values are to be represented as modified color values, applying a color coordinate transformation to the color space subset by applying a color transformation function representing the color coordinate transformation to the second function representing the color space subset to produce a modified second function;

wherein computing the composition of the first and second functions to produce the space-color separable function includes computing the composition of the first function and the modified second function;

the color coordinate transformation being applied to the color space subset independently of the spatial image structure of the input color image region by modifying the second function independently of the first function; the space-color separable function, when used in place of the image region data items to represent the input color image region, producing a rendered color image region having the modified color values.

3. The method of claim 1 for operating a processor-controlled machine to compute a function representing original color values of original image locations in an input color image region further including, when the original image locations are to be represented as modified image locations, applying an image coordinate transformation to the input color image region by applying an image transformation function representing the image coordinate transformation to the first function representing the spatial image structure of the input color image region to produce a modified first function;

wherein computing the composition of the first and second functions to produce the space-color separable function includes computing the composition of the modified first function and the second function;

the image coordinate transformation being applied to the spatial structure of the input color image region independently of the color space structure of the input color image region by modifying the first function independently of the second function; the space-color separable function, when used in place of the image region data items to represent the input color image region, producing a rendered color image region having the modified image locations.

4. The method of claim 1 for operating a processor-controlled machine to compute a function representing original color values of original image locations in an input color image region wherein the first function is a polynomial function, and wherein the second function is a linear function.

5. An article of manufacture for access by a machine that includes a memory device for storing data; storage medium access circuitry for accessing a medium that stores data; and a processor connected for accessing the data stored in the memory device and for receiving data from the storage medium access circuitry; the article comprising:

a data storage medium that can be accessed by the storage medium access circuitry when the article is accessed by the machine; and data stored in the data storage medium so that the storage medium access circuitry can provide the stored data to the processor when the article is accessed by the machine; the stored data comprising instruction data indicating instructions the processor can execute;

the processor, in executing the instructions, obtaining a plurality of image region data items indicating image definition data defining an input color image region; each image region data item indicating coordinate values of a respective original image location in the input color image region and an original color value of the respective original image location;

the processor, further in executing the instructions, computing a first function to represent a spatial image structure of the input color image region; the first function mapping each coordinate value indicating an original image location in the input color image region to a point in a parameter space;

the processor, further in executing the instructions, computing a second function to represent a color space subset of a color space structure of the input color image region; the second function mapping each point in the parameter space to a color space location in the color space subset; and the processor, still further in executing the instructions, computing the composition of the first and second functions to produce a third function, referred to as a space-color separable function, for mapping coordinate values of the input color image region to color values in the color space subset; the space-color separable function approximating the original color values and the original image locations in the input color image region; the space-color separable function, when used in place of the image region data items to represent colors in the input color image region, producing a rendered color image region substantially similar in appearance to the input color image region.

6. The article of manufacture of claim 5 wherein the processor, in computing the first function, computes a polynomial function, and wherein the processor, in computing the second function, computes a linear function.

7. The article of manufacture of claim 5 wherein the data storage medium that can be accessed by the storage medium access circuitry included in the machine is a network server device physically distinct from the machine that accesses the article; the storage medium access circuitry including communications circuitry for accessing the instruction data stored on the network server device.

8. The article of manufacture of claim 5 wherein the data storage medium that can be accessed by the storage medium access circuitry included in the machine is a storage medium device physically connected to the machine that accesses the article; the storage medium access circuitry being included in the storage medium device.

9. The article of manufacture of claim 5 wherein the processor, still further in executing the instructions, applies a color coordinate transformation to the color space subset by applying a color transformation function representing the color coordinate transformation to the second function representing the color space subset to produce a modified second function; the processor applying the color coordinate transformation to the color space subset when the original color values are to be represented as modified color values; and wherein the processor, in computing the composition of the first and second functions to produce the space-color separable function, computes the composition of the first function and the modified second function; the color coordinate transformation being applied to the color space subset independently of the spatial image structure of the input color image region by modifying the second function independently of the first function; the space-color separable function, when used in place of the image region data items to represent the input color image region, producing a rendered color image region having the modified color values.

10. The article of manufacture of claim 5 wherein the processor, still further in executing the instructions, applies an image coordinate transformation to the input color image region by applying an image transformation function representing the image coordinate transformation to the first function representing the spatial image structure of the input color image region to produce a modified first function; the processor applying the image coordinate transformation to the spatial image structure when the original image locations are to be represented as modified image locations; and wherein the processor, in computing the composition of the first and second functions to produce the space-color separable function, computes the composition of the modified first function and the second function; the image coordinate transformation being applied to the spatial structure of the input color image region independently of the color space structure of the input color image region by modifying the first function independently of the second function; the space-color separable function, when used in place of the image region data items to represent the input color image region, producing a rendered color image region having the modified image locations.

11. A data structure stored on a storage medium capable of being accessed and read by a processor-controlled machine; the data structure representing an original image; the machine including storage medium access circuitry for accessing and reading the data structure stored in the storage medium; the data structure comprising a plurality of region data items; each region data item representing a respective one of a plurality of image regions in the original image; each image region formed by a set of image region boundaries determined to be included in the original image;

each respective one of the plurality of region data items indicating a space-color separable function representing values of image colors and image locations of a respective image region of the original image represented by the respective region data item;

the space-color separable function approximating original color values and original image locations in the respective image region as a composition of a first function and a second function; the first function representing a spatial image structure of the image region and mapping each coordinate value indicating an original image location in the image region to a point in a parameter space; the second function representing a color space subset of a color space structure of the image region and mapping each point in the parameter space to a color space location in the color space subset; the space-color separable function producing a rendered color image region substantially similar in appearance to the respective image region.

12. The data structure of claim 11 wherein an image region boundary in the original image is determined by a discontinuity in a color value in the original image such that a coherent area of the original image having a substantially similar color value indicates an image region in the original image to be represented in the data structure by a region data item.

13. The data structure of claim 11 wherein the original image represented by the data structure is an image definition data structure representation of a continuous-tone color image.

14. In a processor-based system including a memory having instructions stored therein indicating instructions for a color image editing application program the processor executes, and including a display device having a display area wherein an original color image is presented; the original color image being represented in memory as an original image definition data structure; the original color image including a plurality of image regions determined to be included therein; the improvement wherein the processor, in executing the instructions for performing the color image editing application program, produces, for each respective image region determined to be included in the original color image, a representation of the respective image region as a space-color separable function; the space-color separable function approximating original color values and original image locations in the respective image region; the processor, in producing the space-color separable function, obtaining a plurality of image region data items each indicating image definition data defining the respective image region; each image region data item indicating coordinate values of a respective original image location in the respective image region and an original color value of the respective original image location;

computing a first function to represent a spatial image structure of the respective image region; the first function mapping each coordinate value indicating an original image location in the respective image region to a point in a parameter space;

computing a second function to represent a color space subset of a color space structure of the respective image region; the second function mapping each point in the parameter space to a color space location in the color space subset; and computing the composition of the first and second functions to produce the space-color separable function for mapping coordinate values of the respective image region to color values in the color space subset; the space-color separable function, when used in place of the image region data items to represent the respective image region, producing a rendered color image region substantially similar in appearance to the respective image region.

15. The improvement in the processor-based system including the instructions for the color image editing application program of claim 14 wherein the processor, further in executing the instructions for the color image editing application program, performs an editing operation on a respective one of the image regions in the original color image to produce a modified rendered image region in response to a request from a user of the color image editing application program; the modified image region after the editing operation showing at least one of original image locations and original image colors of the respective image region changed in appearance from the original color image; the processor, in executing the instructions for performing the editing operation, applying a transformation function to one of the first and second functions to produce a modified function; and wherein the processor, in executing the instructions for computing the composition of the first and second functions to produce the space-color separable function, uses the modified function to produce the space-color separable function; the space-color separable function, when used in place of the image region data items to represent the image region, producing the modified rendered image region; the transformation function being independently applied to one of the spatial structure and the color space structure of the image region by modifying one function independently of the other function.

* * * * *